US011512534B2

(12) United States Patent
Cole et al.

(10) Patent No.: US 11,512,534 B2
(45) Date of Patent: Nov. 29, 2022

(54) METHOD FOR GUIDING A DOWNHOLE TOOL UNDERGROUND

(71) Applicant: The Charles Machine Works, Inc., Perry, OK (US)

(72) Inventors: Scott B. Cole, Edmond, OK (US); Kip Harkness, Flowermound, TX (US); John Mellesmoen, Hastings, MN (US); Sarah Leick, Dallas, TX (US); Bradley S. Marshall, Perry, OK (US); Jignesh kumar Keshavlal Vaghela, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 762 days.

(21) Appl. No.: 15/425,103

(22) Filed: Feb. 6, 2017

(65) Prior Publication Data

US 2017/0226805 A1 Aug. 10, 2017

Related U.S. Application Data

(60) Provisional application No. 62/375,601, filed on Aug. 16, 2016, provisional application No. 62/291,992, filed on Feb. 5, 2016.

(51) Int. Cl.
*E21B 7/04* (2006.01)
*E21B 47/024* (2006.01)
(Continued)

(52) U.S. Cl.
CPC ............ *E21B 7/046* (2013.01); *E21B 47/024* (2013.01); *E21B 47/0232* (2020.05); *G01S 5/02* (2013.01); *G01S 5/0226* (2013.01)

(58) Field of Classification Search
CPC .................................. E21B 47/02; E21B 7/04
See application file for complete search history.

(56) References Cited

U.S. PATENT DOCUMENTS 5,529,437 A * 6/1996 Filipowski .............. E21D 9/004
299/1.3
6,035,951 A 3/2000 Mercer et al.
(Continued)

OTHER PUBLICATIONS https://www.dictionary.com/browse/instructions. "Instruction" Definition from dictionary.com (Year: 2019).*

*Primary Examiner* — Robert E Fuller
*Assistant Examiner* — Theodore N Yao
(74) *Attorney, Agent, or Firm* — Tomlinson McKinstry, P.C.

(57) ABSTRACT

A system for tracking and guiding a downhole tool underground along a desired borepath. GPS measurements are taken by a GPS unit at desired waypoints on the ground surface that overlays the desired borepath. A planned route for the downhole tool to follow underground is generated from the GPS measurements of the waypoints. A tracker is used to track the location of the downhole tool underground while drilling a borepath. GPS measurements of a series of above-ground locations that overlay the borepath created by the moving downhole tool are taken and sent to the processor. The processor checks for deviation between the GPS measurements of the above-ground locations and the planned route and provides directions to correct the borepath of the downhole tool in response to the deviation.

23 Claims, 11 Drawing Sheets

(51) Int. Cl.
  *G01S 5/02* (2010.01)
  *E21B 47/0232* (2012.01)

(56) References Cited

U.S. PATENT DOCUMENTS

| | | | |
|---|---|---|---|
| 6,250,402 B1 | 6/2001 | Brune et al. | |
| 6,364,035 B2 | 4/2002 | Brune et al. | |
| 6,536,538 B2 | 3/2003 | Brune et al. | |
| 6,668,944 B2 | 12/2003 | Brune et al. | |
| 6,749,029 B2* | 6/2004 | Alft | E21B 7/04 |
| | | | 175/24 |
| 7,000,710 B1 | 2/2006 | Umbach | |
| 7,021,403 B2 | 4/2006 | Brune et al. | |
| 7,347,280 B2 | 3/2008 | Brune et al. | |
| 7,562,722 B2 | 7/2009 | Brune et al. | |
| 8,025,109 B2 | 9/2011 | Brune et al. | |
| 8,393,414 B2 | 3/2013 | Brune et al. | |
| 8,482,286 B2 | 7/2013 | Cole | |
| 2004/0190374 A1* | 9/2004 | Alft | E21B 7/046 |
| | | | 367/14 |
| 2007/0044536 A1* | 3/2007 | Gunsaulis | E21B 7/04 |
| | | | 73/1.79 |
| 2013/0153299 A1 | 6/2013 | Brune et al. | |
| 2013/0175092 A1* | 7/2013 | Kolpack | E21B 7/046 |
| | | | 175/45 |
| 2015/0090496 A1* | 4/2015 | Rempe | E21B 47/02224 |
| | | | 175/45 |

* cited by examiner

METHOD FOR GUIDING A DOWNHOLE TOOL UNDERGROUND

CROSS REFERENCE TO RELATED APPLICATION

This application claims the benefit of U.S. Provisional Patent Application Serial No. 62/375,601 filed on Aug. 16, 2016, and U.S. Provisional Patent Application Serial No. 62/291,992 filed on Feb. 5, 2016, the entire contents of which are incorporated herein by reference.

FIELD

The present invention relates generally to the field of tracking and guiding a downhole tool underground along a desired borepath.

SUMMARY

The invention is directed to a method for guiding a downhole tool attached to a drill string along a desired borepath, the drill string having a first end attached to the downhole tool and an opposed second end attached to a drilling machine. The method comprises the steps of taking a first set of GPS measurements at a plurality of waypoints along the ground surface above the desired borepath using a GPS unit, generating a planned route for the desired borepath using the first set of GPS measurements, and driving the drill string along the desired borepath from its second end. The method further comprises the steps of using a tracker to establish a series of above-ground locations that overlay the actual borepath created by the moving downhole tool, taking a second set of GPS measurements at each of the series of above-ground locations, and checking for deviation of the second set of GPS measurements from the planned route. The method further comprises the steps of generating, in real-time, a modified route for the desired borepath in response to deviation of the downhole tool from the planned route, wherein the modified route is generated using the first set of GPS measurements, and showing the actual borepath created by the downhole tool in relation to the planned or modified route on a display.

The invention is also directed to a system comprising a drill string attached at its first end to a downhole tool and at its second end to a drilling machine at a ground surface, a GPS unit, a tracker, a processor, and a memory operatively coupled to the processor. The memory having instructions stored thereon that, when executed by the processor, cause the processor to check for deviation between a planned route generated from a first set of GPS measurements take at a plurality of waypoints along the ground surface above a desired borepath and a second set of GPS measurements taken at a series of above-ground locations that overlay a borepath created by the moving downhole tool, and correcting the borepath of the drill string in response to any such deviation.

DESCRIPTION

Figure 1:
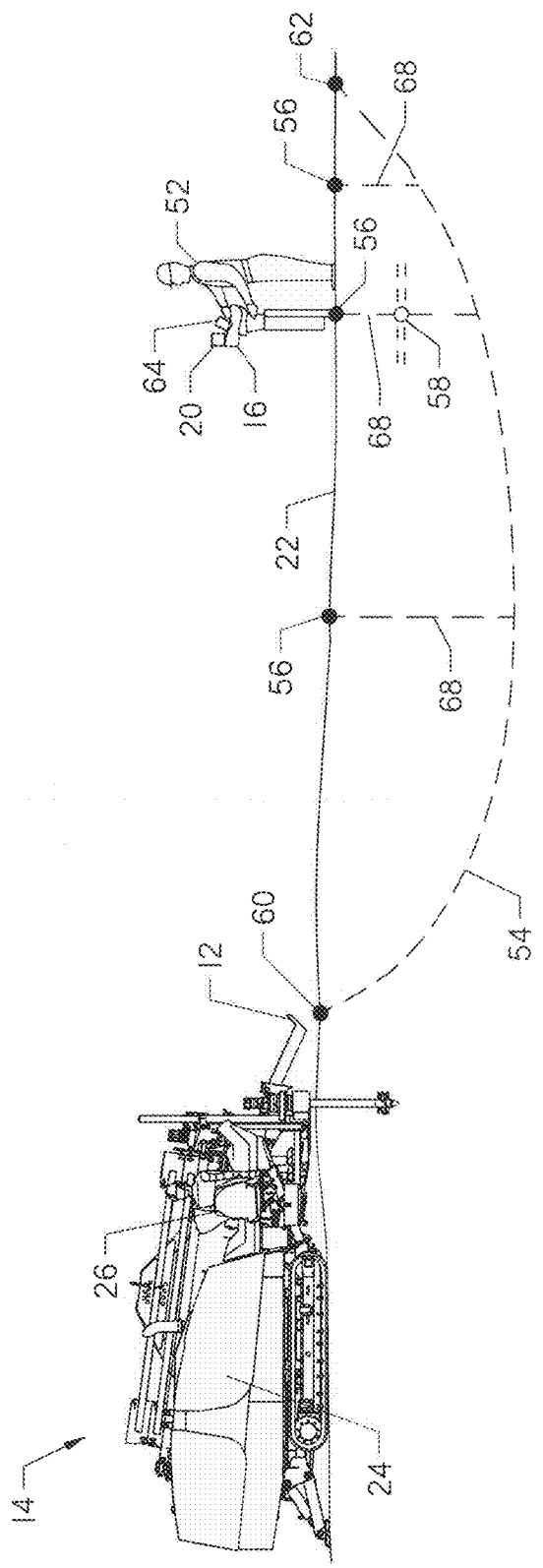
FIG. 1 is an illustration of a worker taking GPS measurements of desired waypoints along a ground surface that overlay a desired borepath to be drilled using a horizontal directional drilling system.

With reference now to FIGS. 1-14, a system 10 for guiding a downhole tool 12 used in horizontal directional drilling operations is shown. The system 10 comprises a drilling machine or rig 14, a tracker 16, a processor 18, a GPS unit 20, and the downhole tool 12. In current horizontal directional drilling operations, a rig operator skilled in steering the downhole tool 12 is needed to guide the tool underground to create a desired borepath. The system 10 of the present invention is used to assist a rig operator of any skill in making steering decisions, so that a rig operator skilled in steering the downhole tool is not required to perform drilling operations.

Figure 2:
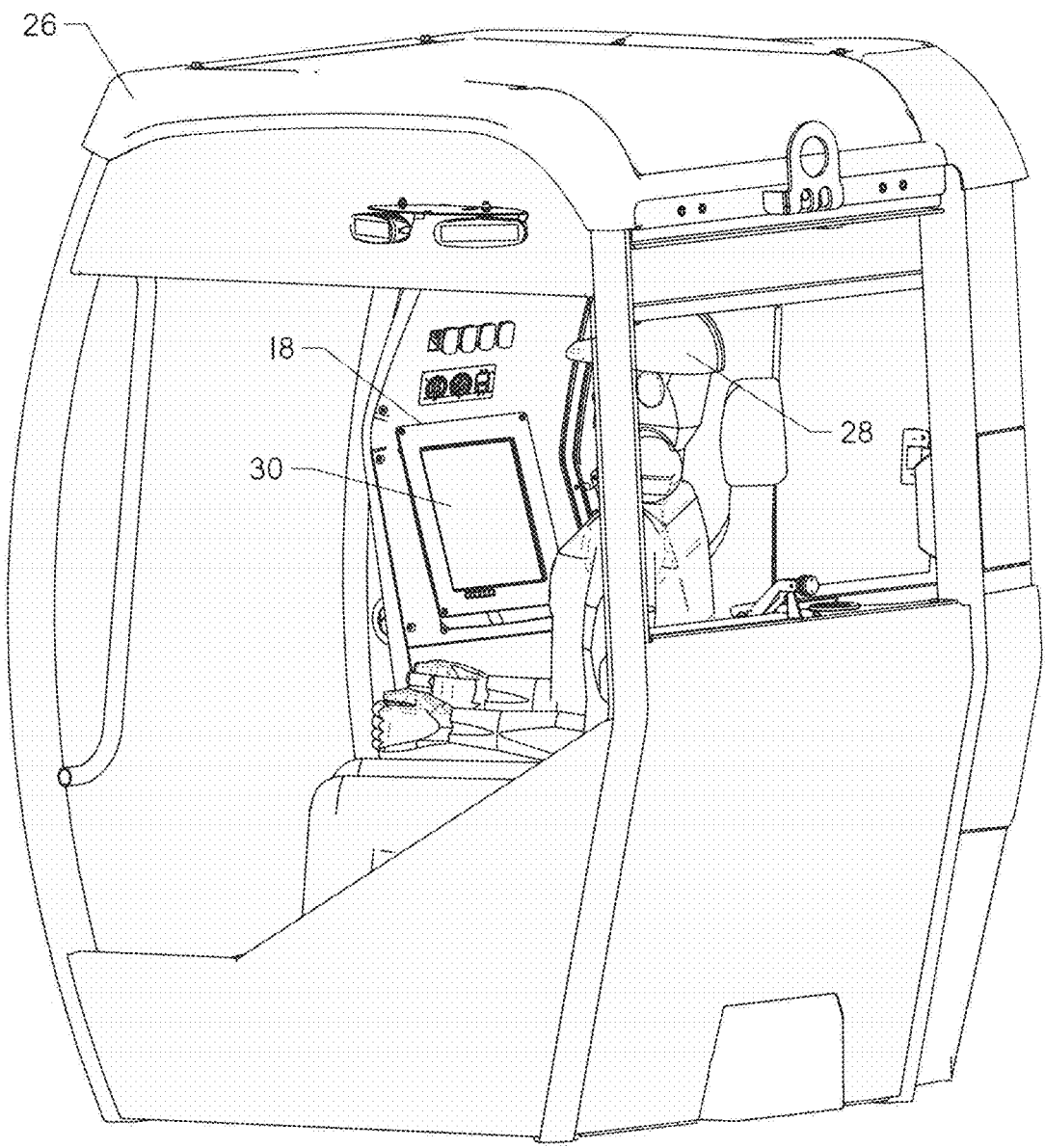
FIG. 2 is a perspective view of an operator station on a drilling machine used with the system of the present invention.
Figure 5:
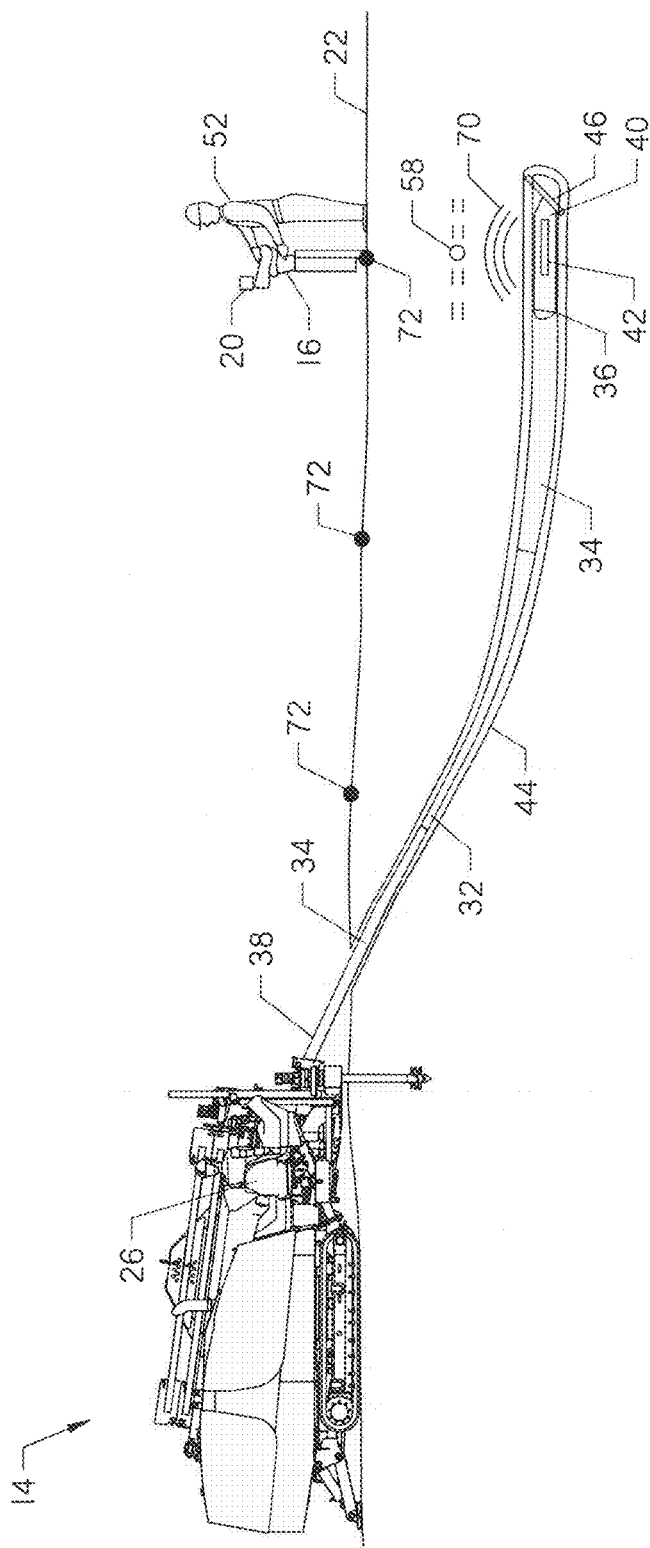
FIG. 5 is an illustration of a horizontal drilling machine driving a drill string attached to the downhole tool underground to create a borepath as the worker detects a position of the downhole tool underground using an above-ground tracker.
Figure 6:
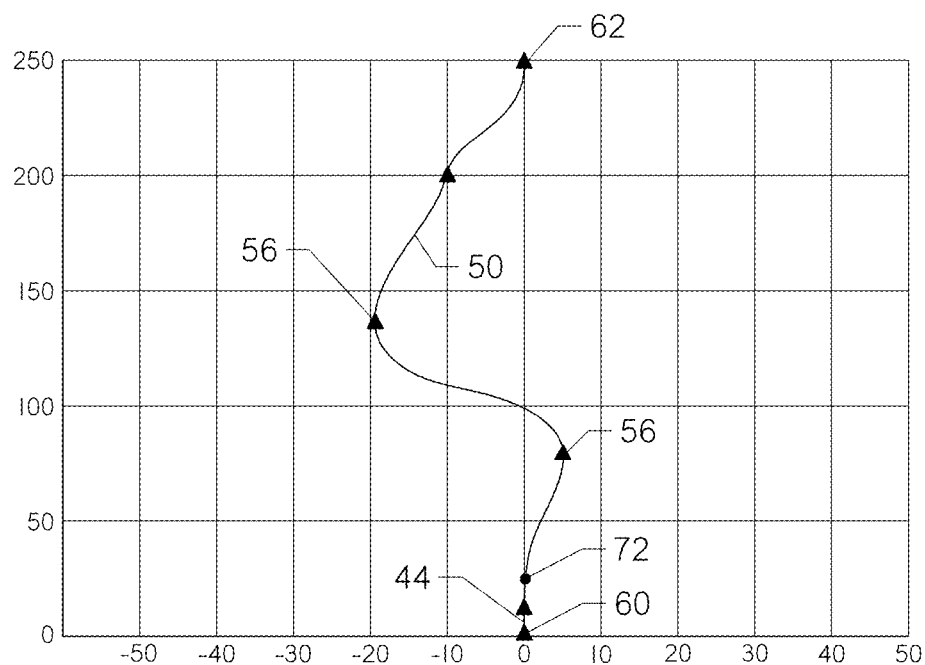
FIG. 6 is the view of FIG. 4 with the borepath created by the downhole tool shown in relation to the planned route.
Figure 7:
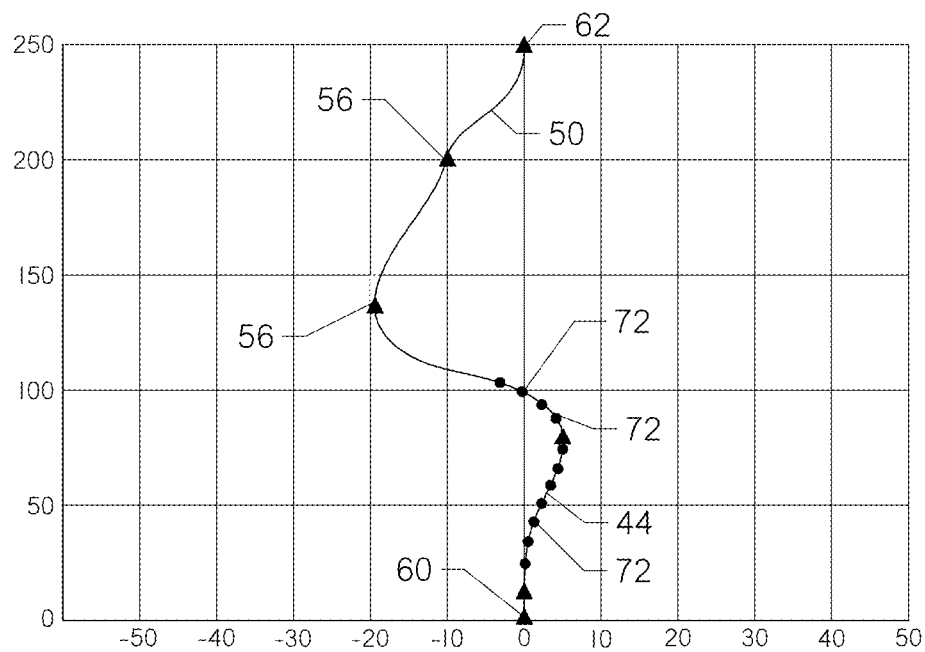
FIG. 7 is the view of FIG. 6 showing the borepath progressing in relation to the planned route.

With reference to FIGS. 1-2 and 5, the drilling machine 14 is shown sitting on a ground surface 22. The drilling machine 14 comprises an engine 24 and an operator station 26. A rig operator 28 controls the drilling machine 14 from the operator station 26. The processor 18 having a display 30 is located in the operator station 26. The display 30 conveys information about the drilling operations to the rig operator 28.

Extending from the drilling machine 14 is a drill string 32. The drill string 32 is made up of a plurality of pipe sections 34 attached end to end. The drill sting 32 is connected to the downhole tool 12 at its first end 36 and the drilling machine 14 at its second end 38.

The downhole tool 12 comprises a drill bit 40 and a beacon 42. In operation, the drill bit 40 will bore underground and advance the downhole tool 12 and the drill string 32 forward creating a borepath 44. The drilling machine 14 will add the plurality of pipe sections 34 to the drill string 32 as the downhole tool 12 advances underground.

Figure 11:
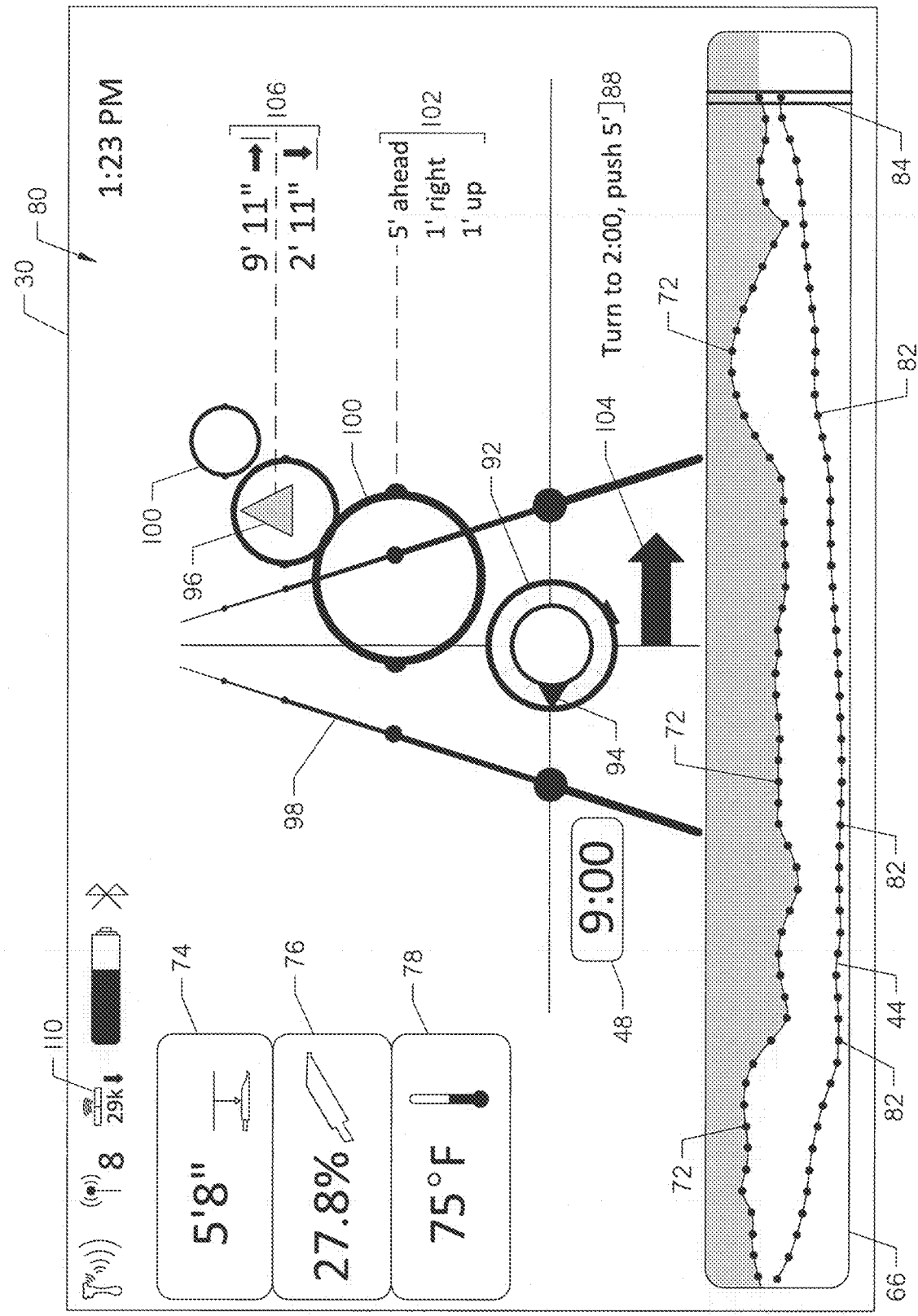
FIG. 11 is a straight on view of a display depicting a drilling view showing the real-time position of the downhole tool underground as compared to the planned route.
Figure 12:
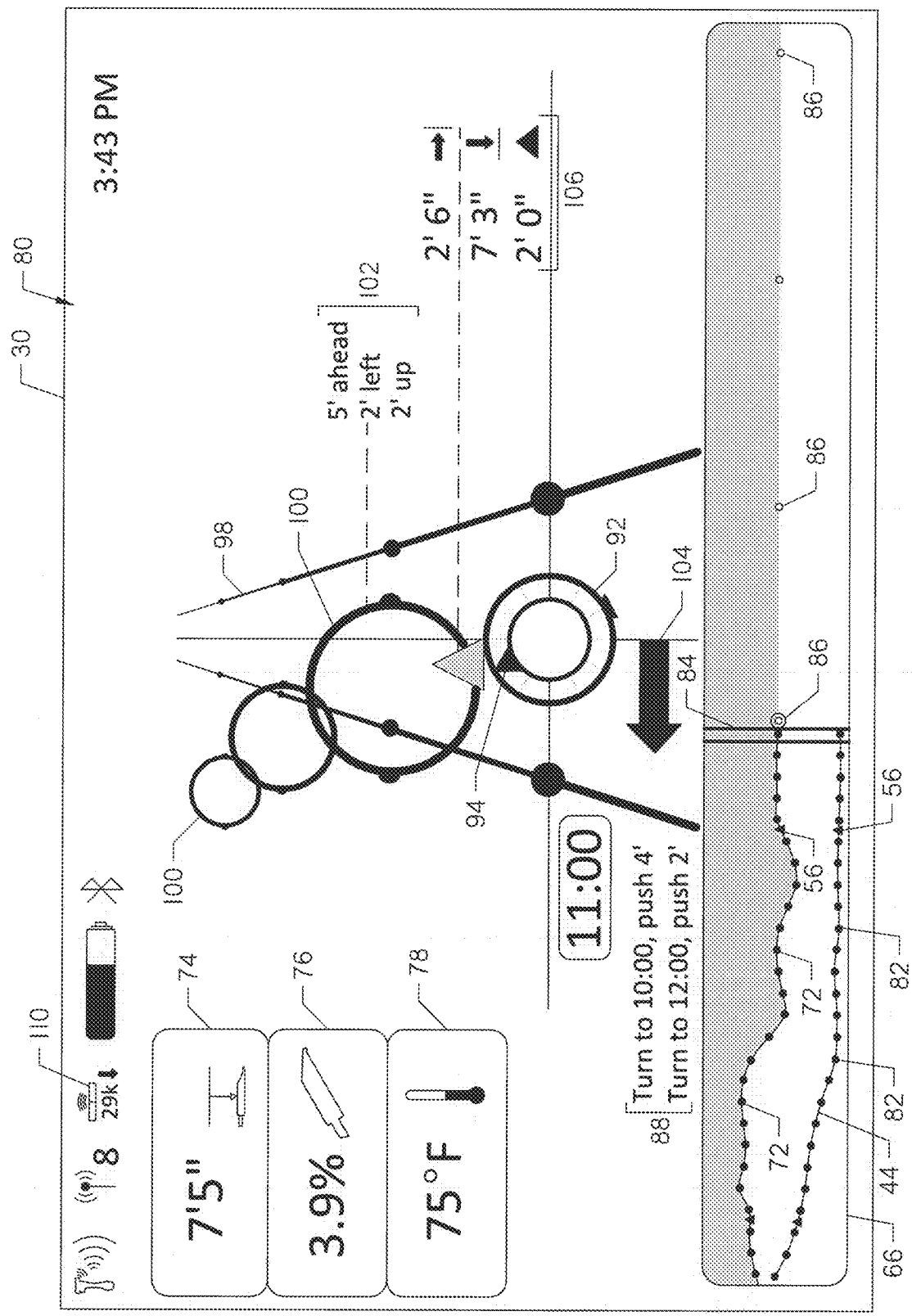
FIG. 12 is the view of FIG. 11 with the downhole tool shown approaching a different area of the planned route.
Figure 13:
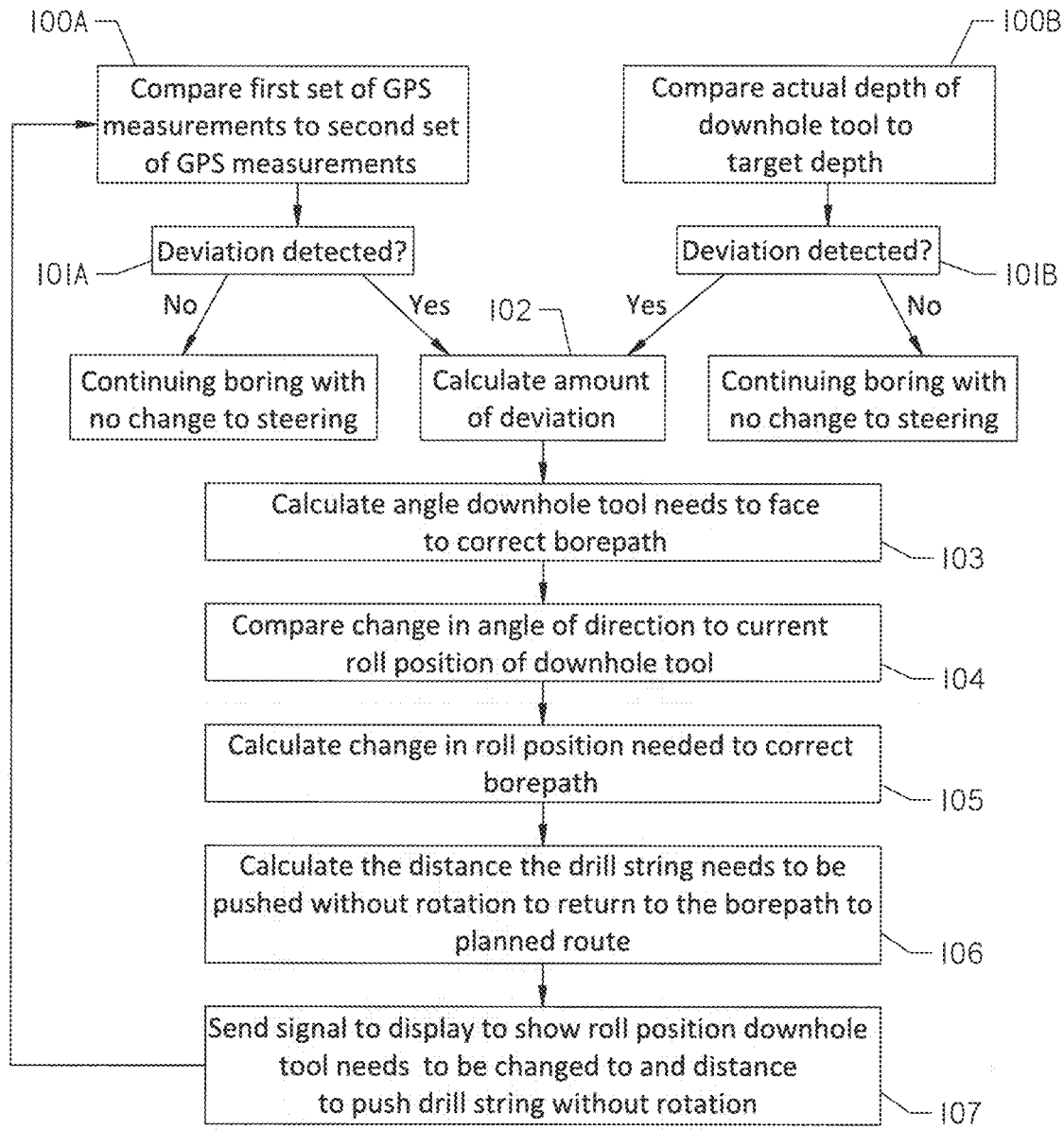
FIG. 13 is a flow chart depicting the method the processor uses to compare the borepath to the planned route.
Figure 14:
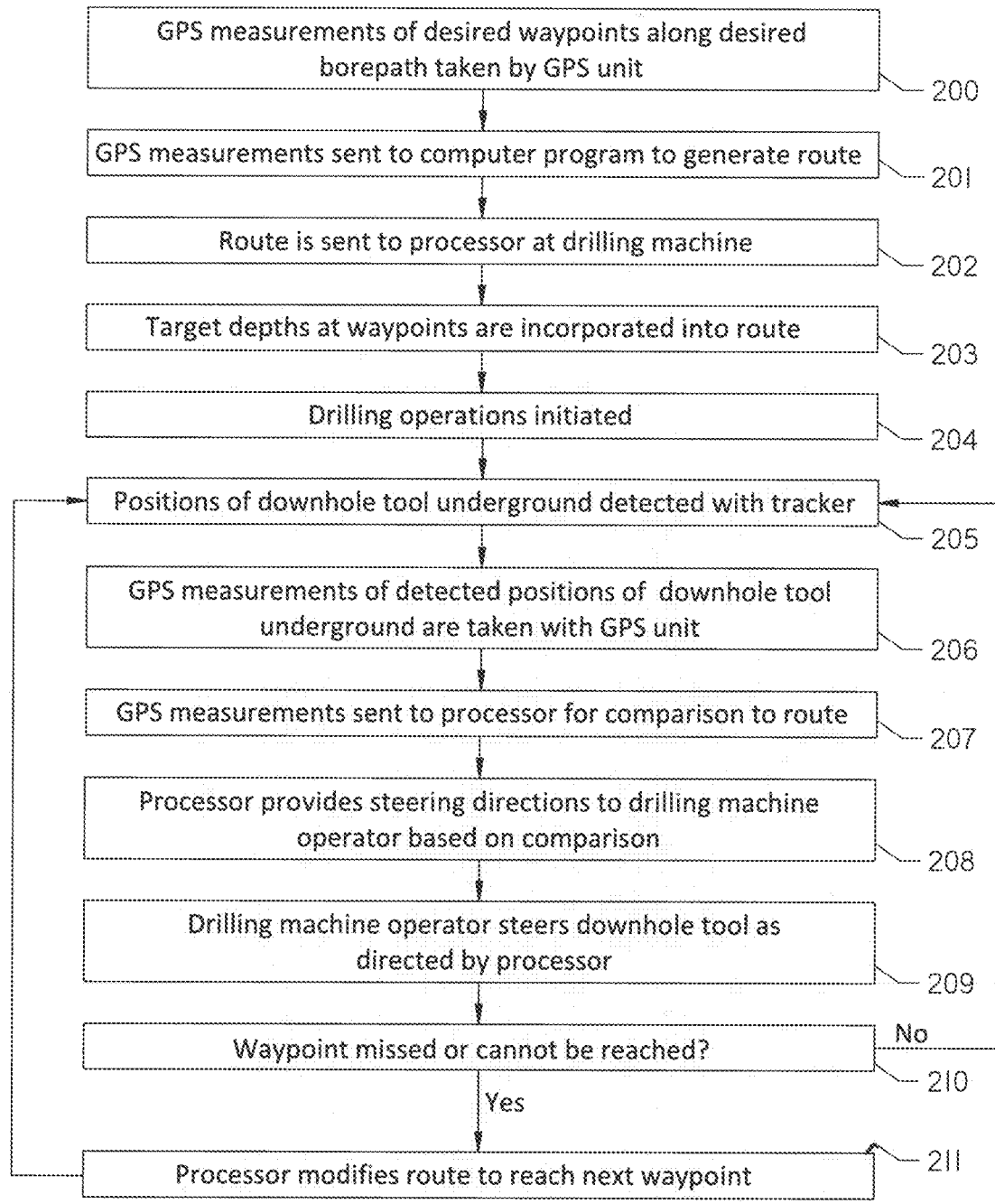
FIG. 14 is a flow chart depicting the method of operation of the system of the present invention.

A slant face 46 on the drill bit 40 is used to steer the downhole tool 12 underground. The angled nature of the slant face 46 directs the downhole tool 12 in different directions depending on a roll position 48 of the drill bit 40. The roll position 48 is the direction the slant face 46 of the drill bit 40 is facing as the downhole tool 12 rotates about its horizontal axis. The roll position 48 of the downhole tool 12 is determined by comparing the position of the slant face 46 of the drill bit 40 to the numbers on a clock face, as shown in FIGS. 11-12. When the slant face 46 of the drill bit 40 is facing directly upwards, the drill bit is considered to be at 12 o'clock.

The drilling machine 14 rotates the downhole tool 2 by rotating the drill string 32. When steering, the drilling machine 14 pushes the drill string 32 forward without rotation. Once the downhole tool 12 has been redirected to the direction it needs to bore, the drill string 32 is continually rotated again. The downhole tool 12 bores straight in the direction and angle it is facing when the downhole tool and drill string 32 are continually rotated.

Alternatively, the drill bit 40 may have cutting teeth and an asymmetrical portion used to deflect the drill bit 40 in different directions to effectuate steering. A deflection shoe or bent sub may also be used to steer the drill bit 40.

A planned route 50 for the downhole tool 12 is generated before drilling begins. To plan the route, a worker 52 will walk along the ground surface 22 that overlays a desired borepath 54 and take GPS measurements of desired waypoints 56. The waypoints 56 may overlay or coincide with important points along the desired borepath 54. For example, the waypoints 56 may include the entry and exit points for the downhole tool 12. The waypoints 56 may also include points overlaying underground turns in the desired borepath 54, and points overlaying underground obstacles 58 blocking the desired borepath 54. Alternatively or in addition, the waypoints 56 may be equally spaced points along the ground surface 22 above the desired borepath 54. For example, a waypoint 56 may be designated every ten feet along the ground surface 22. A first waypoint 60 taken by the worker 52 is preferably at the drilling machine 14 or the entry point for the downhole tool 12 into the ground surface 22, and a last waypoint 62 is preferably the end of the desired borepath 54.

Figure 3:
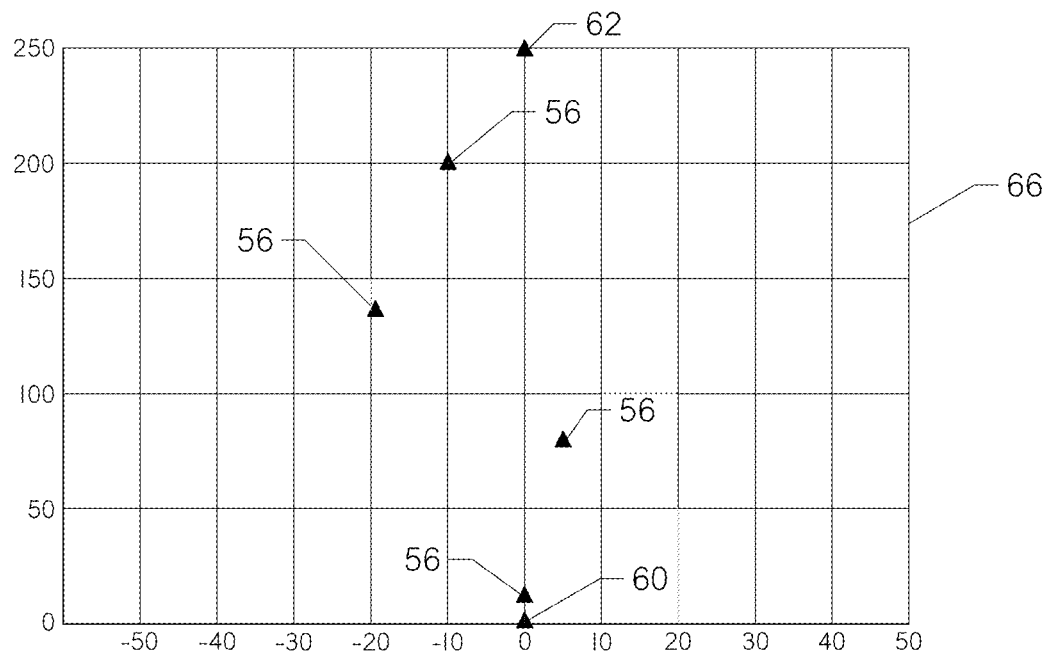
FIG. 3 is a bird's eye view of the waypoints plotted on a map to be viewed on a display.
Figure 4:
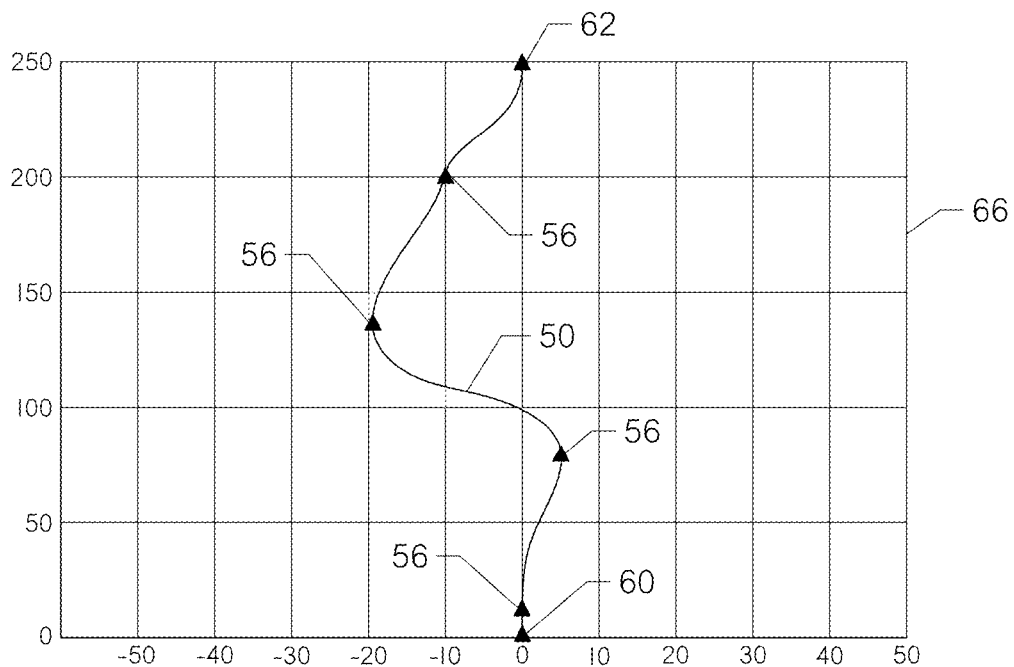
FIG. 4 is the view of FIG. 3 showing a planned route for the downhole tool to follow underground.

The GPS unit 20 sends the GPS measurements of the waypoints 56 to a computer program or application specifically formatted to generate the planned route 50. The computer application and the GPS unit 20 communicate over Bluetooth. The computer application may be stored in memory on a handheld device 64, such as a smart phone or tablet. The computer application may also be stored in memory on the processor 18 at the drilling machine 14. The computer application generates the planned route 50 by plotting the GPS measurements of the waypoints 56 on a map 66 and connecting the points, as shown in FIGS. 3-4. If the planned route 50 is generated on a handheld device 64, the route 50 will be sent to the processor 18 to be stored on the processor's memory after it is generated.

The planned route 50 may be viewed by the worker 52 on the handheld device 64 and by the rig operator 28 on the display 30 at the drilling machine 14. The planned route 50 shown in FIG. 4 is shown as a bird's eye, view. The bird's eye view may be overlaid on a street map to help orient the rig operator 28 and the worker 52. Alternatively, the planned route 50 may be shown on an isometric or side view on the display 30 or handheld device 64.

The GPS unit 20 shown in FIGS. 1 and 5 is supported on the tracker 16 held by the worker 52. The GPS unit 20 may also be independent from the tracker 16. For example, the GPS unit 20 may be handheld or contained in a bag worn by the worker 52. GPS units that are capable of 4 cm to 50 cm of accuracy with real-time kinematic correction are useful with the system 10. One such hand-held. GPS unit suitable for use with the present invention is the R1 GNSS Receiver by Trimble Navigation Limited. The R1 GNSS receiver is capable of up to 50 cm of accuracy. A larger GPS unit suitable for use with the invention is the R2 GNSS Receiver from Trimble Navigation Limited that is capable of accuracy up to 4 cm. Other GPS receivers having a desired accuracy and correction rate needed for the drilling operation may also be used in the present invention.

Prior to starting drilling operations, the worker 52 may also determine the target drilling depths 68 for the downhole tool 12 at each of the waypoints 56, as shown in FIG. 1. The target drilling depths 68 may be inputted into the tracker 16 while the worker 52 is taking GPS measurements of the waypoints 56 and then sent to the processor 18. The processor 18 may incorporate the target drilling depths 68 into the planned route 50. Alternatively, the rig operator 28 may manually incorporate the target drilling depths 68 at each of the waypoints 56 into the planned route 50 using the controls at the operator station 26.

The target depths 68 for the downhole tool 12 are preferably uniform throughout the planned route 50 so that a level borepath 44 is created. A locator may be used to determine the position of any obstacles 58 that might block the desired borepath 54, such as the buried pipe in FIG. 1. The course of the desired borepath 54 may be adjusted to avoid such obstacles. For example, the downhole tool 12 needs to drill deeper in FIG. 1 to get around the buried pipe 58.

Once the planned route 50 has been created, the rig operator 28 may start driving the drill string 32 underground to create the borepath 44. While the downhole tool 12 is boring, the worker 52 will walk along the ground surface 22 that overlays the desired borepath 54 with the tracker 16 to try to find where the downhole tool 12 is located underground. The tracker 16 will detect a position of the downhole tool 12 underground, as shown in FIG. 5. The beacon 42 contained within the downhole tool 12 will emit a beacon signal 70 at a designated frequency. The tracker 16 is adapted to receive the beacon signal 70 and determine the position of the downhole tool 12 underground relative to the tracker 16. The tracker 16 detects the beacon signal 70 in three dimensions (x, y, z) relative to the tracker.

The worker 52 will detect the position of the downhole tool 12 after each pipe section 34 has been added to the drill string 32. The worker 52 will track the position of the downhole tool 12 until the tracker 16 is positioned directly over the beacon 42. The tracker 16 is positioned directly over the beacon 42 when the lateral distance between the tracker and beacon reads zero. This is also referred to as a null point. Once the tracker 16 is located directly over the beacon 42, the worker 52 will take a GPS measurement of an above-ground location 72 that overlays the underground position of the beacon 42. The GPS unit 20 may send the GPS measurement to the tracker 16 over Bluetooth.

The tracker 16 will also detect information about the downhole tool 12 from the beacon, such as a depth 74 from the tracker to the beacon 42, a percentage grade or angle of incline 76 of the drill bit 40, the roll position 48 of the downhole tool 12, a temperature 78 of the beacon 42 underground, and a cardinal direction the downhole tool 12 is facing. The tracker 16 will send the information detected about the downhole tool 12 and the GPS measurement of the above-ground location 72 to the processor 18 at the drilling machine 14. The tracker 16 and the processor 18 communicate over radio waves. The information detected about the downhole tool 12 may be shown on the drilling view 80 on the display 30. The worker 52 will continue this method after each pipe section 34 is added to the drill string 32.

Each GPS measurement of the above-ground locations 72 may be plotted on the map 66 shown on the display 30 in relation to the planned route 50, as shown in FIGS. 6-10. The above-ground locations 72 may be connected on the map 66 to show a bird's eye view of the progression of the actual borepath 44. A side view of the map 66 may also be shown on a drilling view 80 on the display 30, as shown in FIGS. 11-12. The above-ground locations 72 are shown at the ground surface 22 in the side view and the borepath 44 is shown underground. A series of live boring positions 82 indicate the location of the downhole tool 12 underground at the time it was detected by the tracker 16. A set of lines 84 represent the current location of the downhole tool 12 during operation. The upcoming waypoints 56 are represented as circles 86, shown in FIG. 12. The circles 86 may start to blink if the downhole tool 12 is approaching one of the waypoints 56.

To correct the steering of the borepath 44, the processor 18 compares the borepath 44 to the planned route 50. This process is explained with reference to steps 100-107 shown in FIG. 13. The processor 18 corrects the steering by comparing the first set of GPS measurements corresponding to the waypoints 56 on the ground surface to the second set of GPS measurements corresponding to the above-ground locations 72. (Step 100A). The processor 18 looks for deviation by the second set of GPS measurements from the first set of GPS measurements. (Step 101A). The processor 18 also compares the target depths 68 for the downhole tool 12 below each of the waypoints 56 to the actual depth 74 of the downhole tool 12 and looks for any deviation. (Steps 100B and 101B). If no deviation is detected, the downhole tool 12 will continue boring in the current direction. If any deviation of the borepath 44 from the planned route 50 is detected, the processor 18 will calculate amount of deviation. The processor 18 then calculates the difference between the angle the downhole tool 12 is currently facing as compared to the angle the downhole tool 12 needs to face to correct the borepath 44. (Steps 102 and 103).

Once the processor 18 has calculated the angle the downhole tool 12 needs to face to correct the borepath 44, the processor will compare this angle to the current roll position 48 of the downhole tool 12. (Step 104). The processor 18 will then calculate the amount of change to the roll position 48 needed to correct the borepath 44. (Step 105). The processor 18 will also calculate the distance the drill string 32 needs to advance forward without rotating in order to correct to the borepath 44. (Step 106). This information is shown on the display 30 in response to a signal from the processor 18. (Step 107). This information serves as steering directions 88 for the rig operator 28 to manually follow in order to keep the downhole tool 12 drilling, the borepath 44 along the planned route 50. The steering directions 88 may be shown on the drilling view 80, as shown in FIGS. 11-12. Multiple steering directions 88 may be shown if both the depth and lateral direction of the borepath 44 need to be corrected, as shown in FIG. 12.

In FIG. 11, for example, the tracker 16 determined the slant face 46 is facing 9 o'clock. Based on the deviation between the borepath 44 and the planned route 50, the processor 18 calculated that the roll position 48 of downhole tool 12 should be changed to 2 o'clock. The processor 18 further calculated that the downhole tool 12 and drill string 32 should be pushed forward 5 feet without rotation before the drill string 32 may be continually rotated again. The rig operator 28 may determine how far the drill string 32 has been pushed underground without use of the tracker 16. The rig operator 28 does this by comparing the length of each pipe section 34 being added to the drill string 32 to the distance needed to be pushed without rotation.

In FIG. 12, for example, the steering directions 88 indicate that the downhole tool 12 also needs to change depth. The steering directions 88 direct the rig operator 28 to turn the slant face 46 to 10 o'clock and push for 4 feet, then turn the slant face 46 to 12 o'clock and push for 2 feet before boring straight again. If the downhole tool 12 approaches a turn in the planned route 50, the downhole tool 12 may need to be pushed without rotation for a longer distance than if mild steering corrections are being made.

Alternatively, the drilling machine 14 may automatically steer the downhole tool 12 in response to signals from the processor 18. For example, the processor 18 may send a signal to the drilling machine 14 to automatically rotate the drill string 32 and downhole tool 12 to the needed roll position 48 and push the drill string 32 forward for a distance without rotating.

Figure 8:
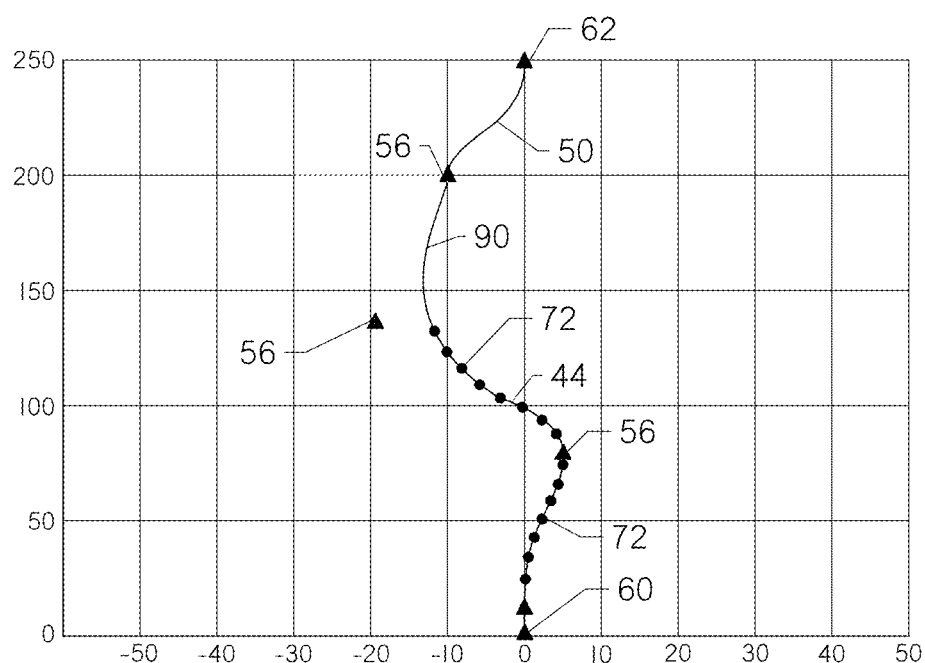
FIG. 8 is the view of FIG. 7 showing a modified route to account for a bend radius of the drill string.
Figure 9:
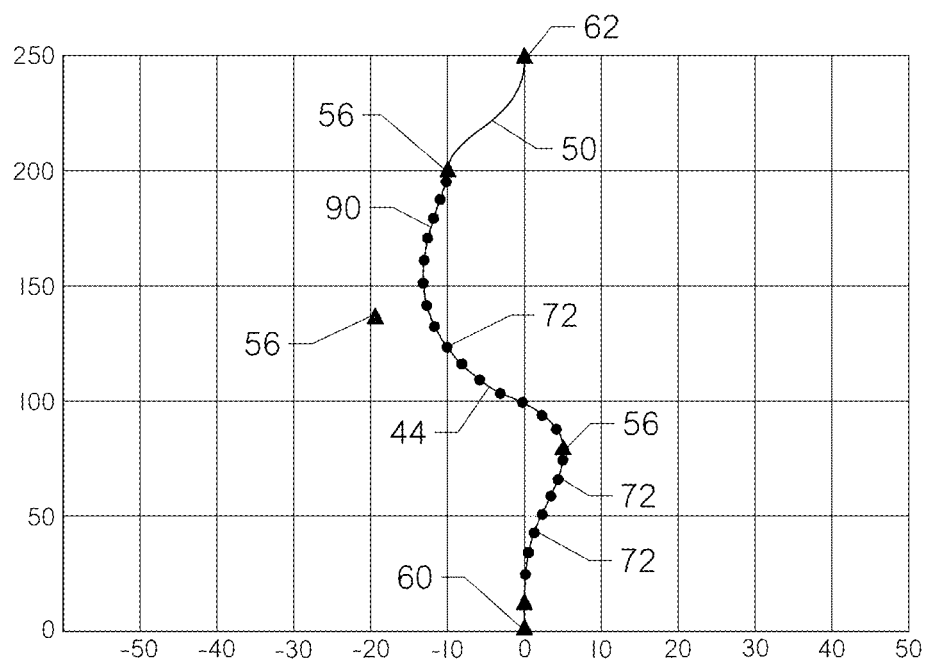
FIG. 9 is the view of FIG. 8 showing the borepath progressing in relation to the modified route.
Figure 10:
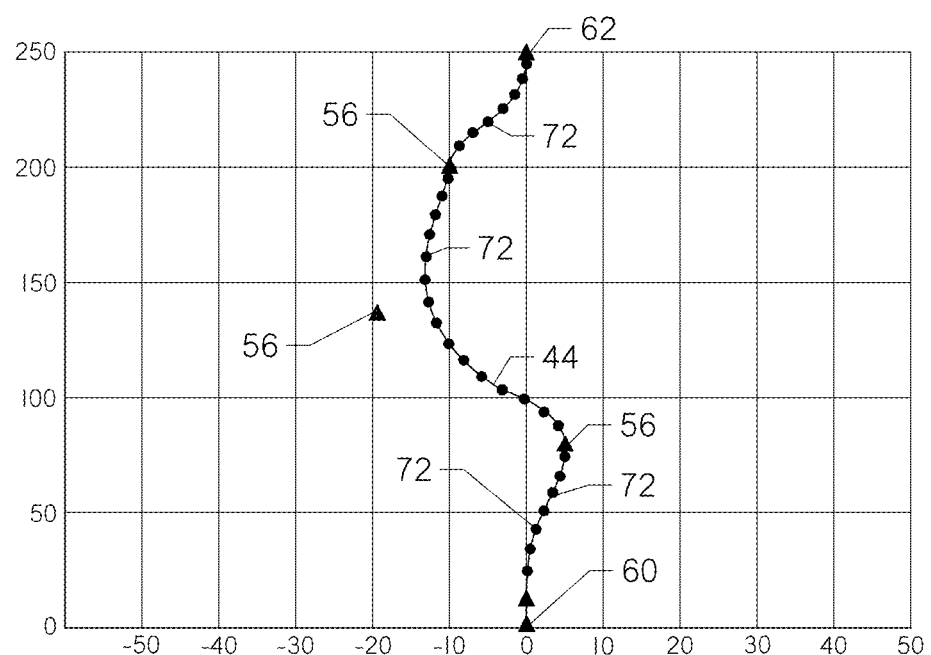
FIG. 10 is the view of FIG. 9 showing the completed borepath.

The goal for the rig operator 28 is drill the borepath 44 so that it at least passes directly under each waypoint 56 on the ground surface 22. If the downhole tool 12 deviates from the planned route 50 such that it misses a waypoint 56, the processor 18 will automatically re calculate or modify the planned route 38 to direct the borepath 55 to the next waypoint 56. The processor 18 may also take into account the vertical or horizontal bend radius of the drill string 32 when generating the planned route 50 and while drilling the borepath 55. If the processor 18 determines that the drill string 24 is not capable of bending sharp enough to reach one of the waypoints 56 along the planned route 50, the processor 18 will automatically modify the route to account for the bend limitations of the drill string 32. An example of a modified route 90 is shown in FIGS. 8-10.

The drilling view 80 provides real-time updates to the rig operator 28 of the position of the downhole tool 12 on the borepath 44 as compared to the planned route 50. The drilling view 80 also provides real-time updates of the position of the tracker 16 at the ground surface 22 in relation to the downhole tool 12 and the planned route 50. The position of the tracker 16 is important to ensure that the GPS measurements of above-ground locations 72 are taken directly over the beacon 42. This ensures greater accuracy when comparing the borepath 44 to the planned route 50.

The position of the downhole tool 12 underground is represented on the drilling view 80 as the downhole tool icon 92. The downhole tool icon 92 shown on the drilling view 80 has an arrow 94. The arrow 94 represents the current roll position 48 of the downhole tool 12 underground. The position of the tracker 16 on the ground surface in relation to the planned route 50 is represented on the drilling view 80 as a triangle 96. A runway 98 shown on the drilling view 80 represents the borepath 44 the downhole tool 12 will create if no changes are made to the steering. A series of rings 100 represent the planned route 50.

The rings 100 are equally spaced at desired increments. The increments are preferably not greater than 15 feet or less than 5 feet. The position of the rings 100 as compared to the runway 96 on the display 30 helps the rig operator 28 to steer the downhole tool 12 along the planned route 50. New rings 100 will appear as the downhole tool 12 progresses along the planned route 50. The drilling view 80 may also display a set of data 102, including the distance ahead, left/right direction and depth from the downhole tool 12 to the next ring 100. The processor 18 calculates the data 102 by comparing the borepath 44 to the planned route 50. The data 102 helps to orient and assist the rig operator 28 in steering of the downhole tool 12

A direction arrow 104 is shown below the downhole tool icon 92 in the drilling view 80. The direction arrow 104 may also help the rig operator 28 determine which direction to steer the downhole tool 12 to stay on the planned route 50. For example, the direction arrow 104 in FIG. 11 is pointing towards the right or the direction of the rings 100. The amount of steering to the right required to stay on the planned route 50 may correspond with the magnitude of the direction arrow 104. If the downhole tool 12 needs to bore straight, the direction arrow 104 may not appear in the drilling view 80.

The triangle 96 shown on the drilling view 80 moves on the display 30 in real-time as the worker 52 moves the tracker 16 on the ground surface 22 above the borepath 44. Tracker data 106 may be shown on the drilling view 80 to identify the position of the tracker 16 on the ground surface 22 in relation to the downhole tool 12 underground. For example, in FIG. 11, the tracker 16 is 9'11" in front of the downhole tool 12. As the downhole tool 12 and the tracker 16 are moved closer together, this measurement will get closer and closer to zero or the null point. The tracker 16 is at the null point when it is directly over the beacon 42. It is at the null point that the GPS measurement of the downhole tool 12 will be taken by the GPS unit 20 and sent to the processor 18. The tracker 16 may be programmed to continually communicate its position to the processor 18 for view on the display 30, or the tracker 16 may only communicate its position upon commands from the worker 52.

The projected depth of the downhole tool 12, when it reaches a point underlying the tracker 16 may also be displayed as part of the tracker data 106. In FIG. 11, for example, the tracker 16, represented as the triangle 96, is shown a distance in front of and to the right of the downhole tool icon 92. If the tracker 16 stays put and the downhole tool 12 bores towards the tracker, the tracker calculates the downhole tool will be at 2'11" underground by the time it reaches the position of the tracker. The displayed data 106 may also include the difference between the actual depth of the tool 12 and its target depth 68. In FIG. 12, for example, the data 86 notes that the downhole tool 12 needs to come up 2 feet to be at the target depth 68. The tracker data 106 helps orient the rig operator 9 and assist in steering the downhole tool 12.

When the downhole tool 12 reaches a point underground directly below one of the waypoints 56 at the ground surface 22, the waypoint may be shown on the display 30 as a yellow line 108, as shown in FIG. 12. If an obstacle 58 exists at the waypoint 56, the processor 18 may calculate and show on the display 30 the difference between the depth of the downhole tool 12 and the obstacle 58.

The drilling view 80 shown in FIGS. 11-12 may be modified as needed to assist the rig operator 28 in steering the downhole tool 12. For example, the steering directions 88 may be displayed in different units of measurements or forms as needed to better assist the rig operator 28. The method of using the system 10 of the present invention described herein is summarized in steps 200-211, shown in FIG. 14. Steps 205-210 and 211, if needed, are repeated until the downhole tool 12 has bored the entire planned route 50 to complete the borepath 44.

Prior to starting drilling operations, the worker 52 may also use the tracker 16 to determine what frequency to tune to the tracker and beacon 42 to while drilling. A frequency icon 110 shown in FIGS. 11-12 indicates that the beacon 42 and tracker 16 are communicating for example over a 29k frequency. The optimal frequency may be determined by analyzing the noise at each of the waypoints 56 to determine the frequency with the least amount of noise present. A borepath analyzer, such as the one described in U.S. Pat. No. 9,423,503, entitled "Borepath Analyzer," the entire contents of which are incorporated herein for reference, may be used to determine the preferred frequency to tune the beacon 42 and tracker 16 to during operation.

The tracking functions performed b he worker 52 may also be automated by the use of a drone capable of tracking the downhole tool 12 underground. Such a drone is described in Patent Publication No, 2016/0018551, entitled "Device and Method for Tracking a Downhole Tool," the entire contents of which are incorporated here for reference.

The drilling view 80 described herein may also be used in conjunction with other methods known in the art for guiding a downhole tool 12 underground. For example, the tracker 16 may be used as a target for the downhole tool 12 to drill to. In operation, the worker 52 will set the tracker 16 at increments along the desired borepath 54 and use information about the position of the downhole tool 12 as compared to the tracker to steer the downhole tool towards the tracker. This method is described in more detail in U.S. Pat. No. 8,482,286, entitled "Method For Guiding a Downhole Tool Assembly Using an Above-Ground. Receiver System", the entire contents of which are incorporated herein for reference.

When using this drilling method, the triangle 96 shown on the drilling view 80 serves as the target for the drilling machine operator to drill to. The GPS measurements of the waypoints 56 may also be incorporated into this method. Prior to starting drilling operations, the operator will take GPS measurements of the desired waypoints 56 and mark the waypoints on the ground surface 22. During drilling operations, in addition to moving the tracker 16 at increments along the desired borepath 54, the tracker is set at each waypoint 56. The tracker 16 will take a GPS measurement of the position of downhole tool 12 when it arrives at or proximate the waypoint 56. The worker 52 may later compare the GPS measurements of the waypoints 56 to the GPS measurements of the downhole tool 12 to obtain a summary of the actual borepath 44 drilled compared to the desired borepath 54.

One skilled in the art will appreciate the variations that may be effective in this invention.

What is claimed is:

1. A method for guiding a downhole tool attached to a drill string, the drill string having a first end attached to the downhole tool and an opposed second end attached to a drilling machine, comprising:

taking a first set of GPS measurements at a plurality of waypoints along a ground surface above a desired borepath using a GPS unit;

generating a planned route for the desired borepath using the first set of GPS measurements;

driving the drill string along the desired borepath from its second end, moving the downhole tool;

using a tracker to establish a series of above-ground locations that overlay an actual borepath created by the moving downhole tool;

taking a second set of GPS measurements at each of the series of above-ground locations;

checking for deviation of the second set of GPS measurements from the planned route;

generating corrected steering instructions in response to any deviation that is detected;

showing the corrected steering instructions on a display, creating displayed instructions;

showing all or a portion of the planned route, all or a portion of the actual borepath, and all or a portion of a projected uncorrected borepath on the display, in juxtaposition and in real time; and operating the drilling machine in accordance with the displayed instructions.

2. The method of claim 1 wherein the planned route is generated at a location offboard the drilling machine and thereafter transmitted to the drilling machine.

3. The method of claim 1 wherein deviation from the planned route is corrected by changing a roll position of the downhole tool.

4. The method of claim ₃ wherein correction of deviation from the planned route further comprises pushing the drill string forward without rotation after changing the roll position of the downhole tool.

5. The method of claim 1 wherein the actual borepath is corrected by automatic steering of the drilling machine.

6. The method of claim 1 wherein the actual borepath is corrected by manual steering of the drilling machine by an operator.

7. The method of claim 1 further comprising automatically generating a modified route in response to deviation of the downhole tool from the planned route.

8. The method of claim 1 further comprising automatically generating a modified route in response to any restrictions in bend radius of the drill string.

9. The method of claim 1 further comprising showing a bird's eye view of the planned route on the display.

10. The method of claim 1 wherein the planned route is shown as a series of equally spaced rings on the display.

11. The method of claim 1 further comprising showing the relative positions of the tracker and downhole tool on the display.

12. The method of claim 1 further comprising:
showing a side view of the actual borepath on the display.

13. The method of claim 1 in which the actual borepath is represented by a downhole tool icon on the display.

14. The method of claim 1 in which the projected uncorrected borepath is shown as a runway on the display.

15. The method of claim 1, in which the step of generating a planned route for the desired borepath using the first set of GPS measurements comprises:
generating a map of the planned route for the desired borepath using the first set of GPS measurements; and
showing the map on the display.

16. The method of claim 15, further comprising:
selecting the desired borepath for the drill string after consulting the map.

17. The method of claim 15, further comprising:
after the step of taking a second set of GPS measurements, plotting the second set of GPS measurements on the map.

18. The method of claim 17, further comprising:
after the step of checking for deviation, re-routing an unexecuted portion of the planned route based on the second set of GPS measurements;
generating an updated map showing the actual borepath and the re-routed unexecuted portion of the planned route; and
showing the updated map of the display.

19. The method of claim 18, further comprising:
removing from the display any portion of the map of the planned route that has been superseded by the re-routed unexecuted portion of the planned route.

20. The method of claim 1, further comprising:
showing a bird's eye view and a side view of the actual borepath on the display.

21. The method of claim 1, in which the GPS unit is supported on the tracker.

22. The method of claim 1, in which the downhole tool comprises a beacon and a drill bit.

23. A method for guiding a downhole tool attached to a drill string, the drill string having a first end attached to the downhole tool and an opposed second end attached to a drilling machine, comprising:

taking a first set of GPS measurements at a plurality of waypoints along a ground surface above a desired borepath using a GPS unit;

generating a map of an original planned route for the desired borepath using the first set of GPS measurements;

showing the map of the original planned route on a display;

selecting a desired borepath for the drill string after consulting the map of the original planned route;

driving the drill string along the desired borepath from its second end, moving the downhole tool;

using a tracker to establish a series of above-ground locations that overlay an actual borepath created by the moving downhole tool;

taking a second set of GPS measurements at each of the series of above-ground locations;

plotting the second set of GPS measurements on the map of the original planned route;

generating an updated map of the actual borepath and a modified planned route using the second set of GPS measurements; and showing the updated map of the actual borepath and the modified planned route on the display. and removing from the display any portion of the map of the original planned route that has been superseded by the modified planned route.

\* \* \* \* \*

UNITED STATES PATENT AND TRADEMARK OFFICE
CERTIFICATE OF CORRECTION

| | |
|---|---|
| PATENT NO. | : 11,512,534 B2 |
| APPLICATION NO. | : 15/425103 |
| DATED | : November 29, 2022 |
| INVENTOR(S) | : Cole et al. |

It is certified that error appears in the above-identified patent and that said Letters Patent is hereby corrected as shown below:

In the Specification

Column 3, Line 8, please delete "2" and substitute therefor "12".
Column 3, Line 67, please delete the "." before "GPS".
Column 5, Line 53, please delete "," after the word "drilling".
Column 8, Line 10, please delete "b he" and substitute therefor "by the".
Column 8, Line 26, please delete "." before the word "Receiver".

In the Claims

Column 10, Claim 23, Line 26, please delete "and".
Column 10, Claim 23, Line 28, please delete "." and substitute therefor ";".
Column 10, Claim 23, Line 28, please delete "removing".
Column 10, Claim 23, Line 29, before the word "from" please insert --removing--.

Signed and Sealed this
Third Day of January, 2023

*Katherine Kelly Vidal*

Katherine Kelly Vidal
*Director of the United States Patent and Trademark Office*